(12) United States Patent
Kudoh

(10) Patent No.: US 7,719,775 B2
(45) Date of Patent: May 18, 2010

(54) LENS BARREL AND IMAGING APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/400,401

(22) Filed: Mar. 9, 2009

(65) Prior Publication Data

US 2009/0231730 A1    Sep. 17, 2009

(30) Foreign Application Priority Data

Mar. 11, 2008    (JP)    ............... 2008-061284

(51) Int. Cl.
*G02B 15/14*    (2006.01)
*G03B 9/00*    (2006.01)
*G03B 9/08*    (2006.01)

(52) U.S. Cl. ............... 359/699; 359/694; 359/702; 396/449; 396/458; 396/349; 396/535

(58) Field of Classification Search ......... 359/694–702; 396/55, 85, 242, 348, 349, 448, 535; 348/208.7, 348/347, 364, 367, 375

See application file for complete search history.

(56) References Cited

U.S. PATENT DOCUMENTS

| | | | | |
|---|---|---|---|---|
| 4,671,639 A | * | 6/1987 | Kodaira et al. ............... | 396/132 |
| 5,077,569 A | * | 12/1991 | Notagashira et al. .......... | 396/71 |
| 5,486,889 A | * | 1/1996 | Shintani ...................... | 396/448 |
| 5,822,634 A | * | 10/1998 | Morishita .................... | 396/349 |
| 6,450,708 B1 | * | 9/2002 | Takanashi ................... | 396/448 |
| 6,606,206 B2 | | 8/2003 | Takeshita | |
| 6,715,938 B2 | * | 4/2004 | Takanashi ................... | 396/349 |
| 6,966,709 B2 | * | 11/2005 | Takanashi ................... | 396/448 |
| 2002/0044363 A1 | | 4/2002 | Takeshita | |

FOREIGN PATENT DOCUMENTS

| | | |
|---|---|---|
| JP | 2001-324663 A | 11/2001 |
| JP | 2002-258378 A | 9/2002 |
| JP | 3842087 B2 | 11/2006 |

* cited by examiner

*Primary Examiner*—Loha Ben
(74) *Attorney, Agent, or Firm*—Canon U.S.A., Inc. I.P. Division

(57) ABSTRACT

A lens barrel includes a first tube and second tube, the first tube movable relative to the second tube by rotation of the second tube, an engaging unit disposed on the second tube, and a barrier driving unit disposed on an object side of the first tube that opens and close a barrier. The first tube is relatively moved in an optical axis direction by engaging with the engaging unit. The barrier is opened and closed when a first interlocking unit which is arranged on the barrier driving unit and a second interlocking unit which is arranged on the cam tube are shifted from a non-interlocking state to an interlocking state. When the first interlocking unit and second interlocking unit are in the interlocking state, at least a portion of the first interlocking unit and the engaging unit overlap with each other in a radial direction of the second tube.

6 Claims, 11 Drawing Sheets

LENS BARREL AND IMAGING APPARATUS

BACKGROUND OF THE INVENTION

1. Field of the Invention

The present invention relates to a lens barrel provided on a film camera, a digital camera and the like, and an imaging apparatus having the lens barrel.

2. Description of the Related Art

Conventionally, film cameras which use a silver halide film were widely spread. However, recently digital cameras capable of capturing an image into a memory without using film have quickly spread. Some of these digital cameras have a zoom mechanism for moving a plurality of optical lenses in an optical axis direction to change the imaging magnification. Japanese Patent Application Laid-Open No. 2001-324663 discusses an example of a zoom lens barrel configuration.

In the configuration discussed in Japanese Patent Application Laid-Open No. 2001-324663, a plurality of lens holding units which hold a plurality of lenses are moved in the optical axis direction by a cam ring, and movement in a rotational direction of the lens holding units is regulated by a rotation regulation unit. This configuration allows the optical lenses to be moved to a designated position.

Recently, with the rapid progress in increasing magnification, there has been an increase in a number of lens groups and in an extended total lens length, so that cameras tend to be larger. Meanwhile, there is a strong demand for a thinner camera, so that there is a need to make the camera as thin as possible when the lens barrel is stored in the camera. One way to make the camera thinner is to shorten a dimension of each barrel tube in the optical axis direction and connect the tubes in a multistage configuration. However, such configuration is difficult to achieve as it involves many restrictions in arranging the tubes without intersecting a plurality of cams.

Japanese Patent No. 3842087 and Japanese Patent Application Laid-Open No. 2002-258378 discuss methods to solve this problem.

Recently, cameras are downsized and their optical systems have greater magnification, so that an amount of lens extension movement is increasing. As a result, a movement of a barrier has to be interlocked with the extension amount of the barrel, and many rotation angles need to follow interlocking movement of the barrier with the barrel. At the same time, a barrier interlocking unit has to be arranged which avoids a cam groove.

SUMMARY OF THE INVENTION

The present invention is directed to a lens barrel which can significantly improve a degree of design freedom of an engaging unit, such as a cam groove, even when a barrier driving unit exists, and which can be reliably and efficiently driven.

According to an aspect of the present invention, a lens barrel includes a first and second tube, the first tube which can be movable relative to the second tube by rotation of the second tube, an engaging unit disposed on the second tube, and a barrier driving unit disposed on an object side of the first tube that opens and closes a barrier, wherein the first tube is relatively moved in an optical axis direction by engaging with the engaging unit which is arranged on the second tube, wherein the barrier is opened and closed when a first interlocking unit which is arranged on the barrier driving unit and a second interlocking unit which is arranged on the second tube are shifted from a non-interlocking state to an interlocking state, and wherein when the first interlocking unit and the second interlocking unit are in the interlocking state, at least a portion of the first interlocking unit and the engaging unit overlap with each other in a radial direction of the second tube.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 7:
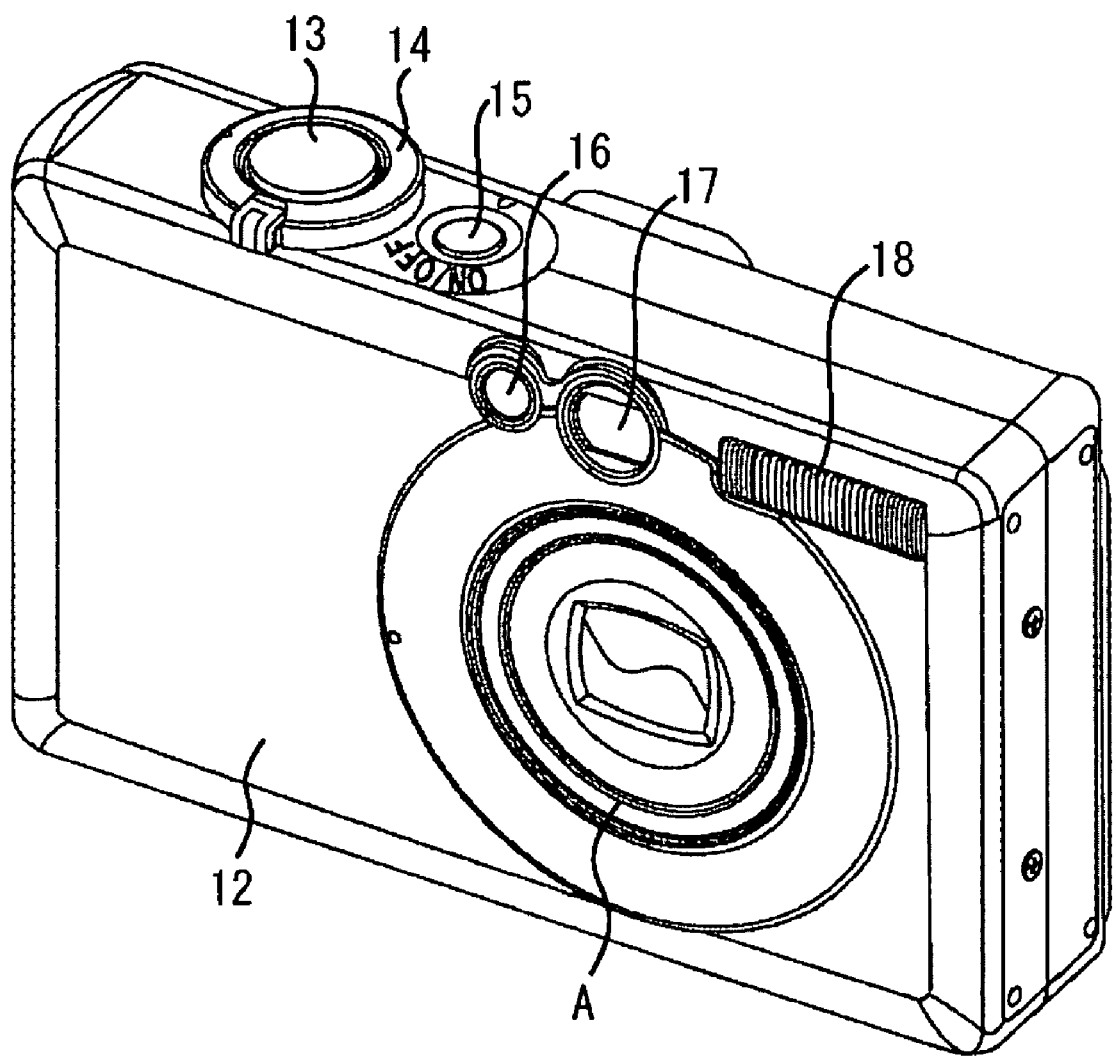
FIG. 7 is a perspective view illustrating a power OFF state of an imaging apparatus having the lens barrel of the exemplary embodiment of the present invention.
Figure 8:
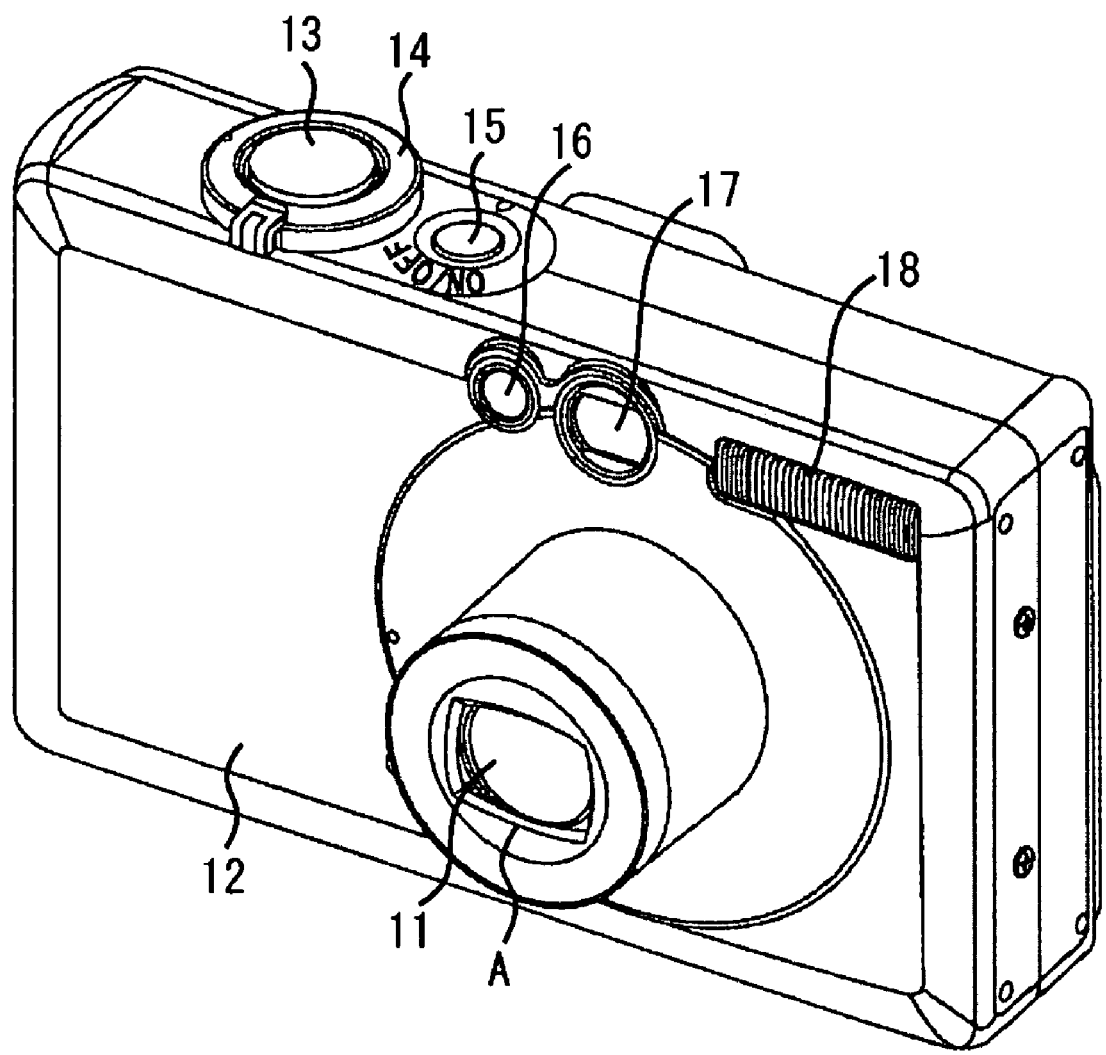
FIG. 8 is a perspective view illustrating a power ON state of the imaging apparatus having the lens barrel of the exemplary embodiment of the present invention.
Figure 9:
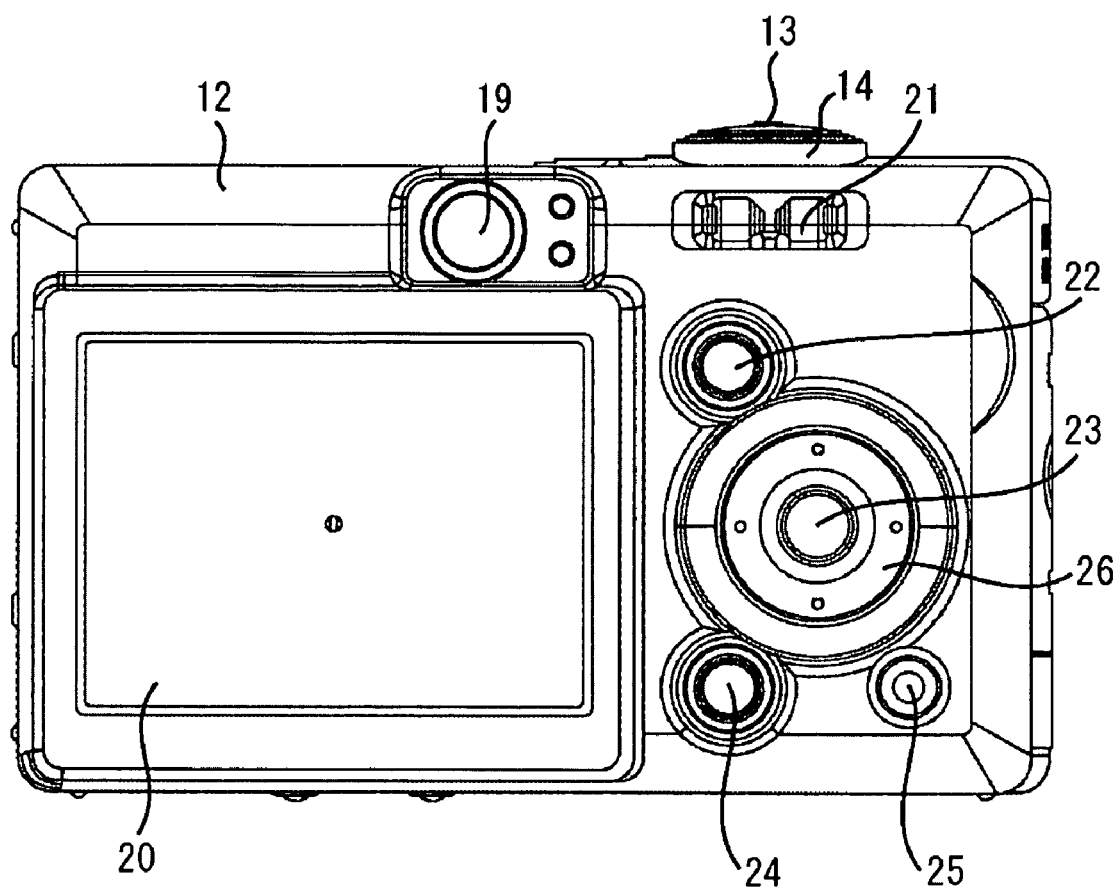
FIG. 9 is a rear view illustrating the imaging apparatus having the lens barrel of the exemplary embodiment of the present invention.

FIGS. 7 to 9 illustrate a digital camera 12 as a device provided with an imaging apparatus according to an exemplary embodiment of the present invention. The digital camera 12 has a zoom mechanism which can change an imaging magnification.

FIG. 7 is an external perspective view illustrating a power OFF state of the digital camera 12. FIG. 8 is an external perspective view illustrating a power ON state of the digital camera 12.

FIG. 9 illustrates a rear view of the digital camera 12.

Figure 10:
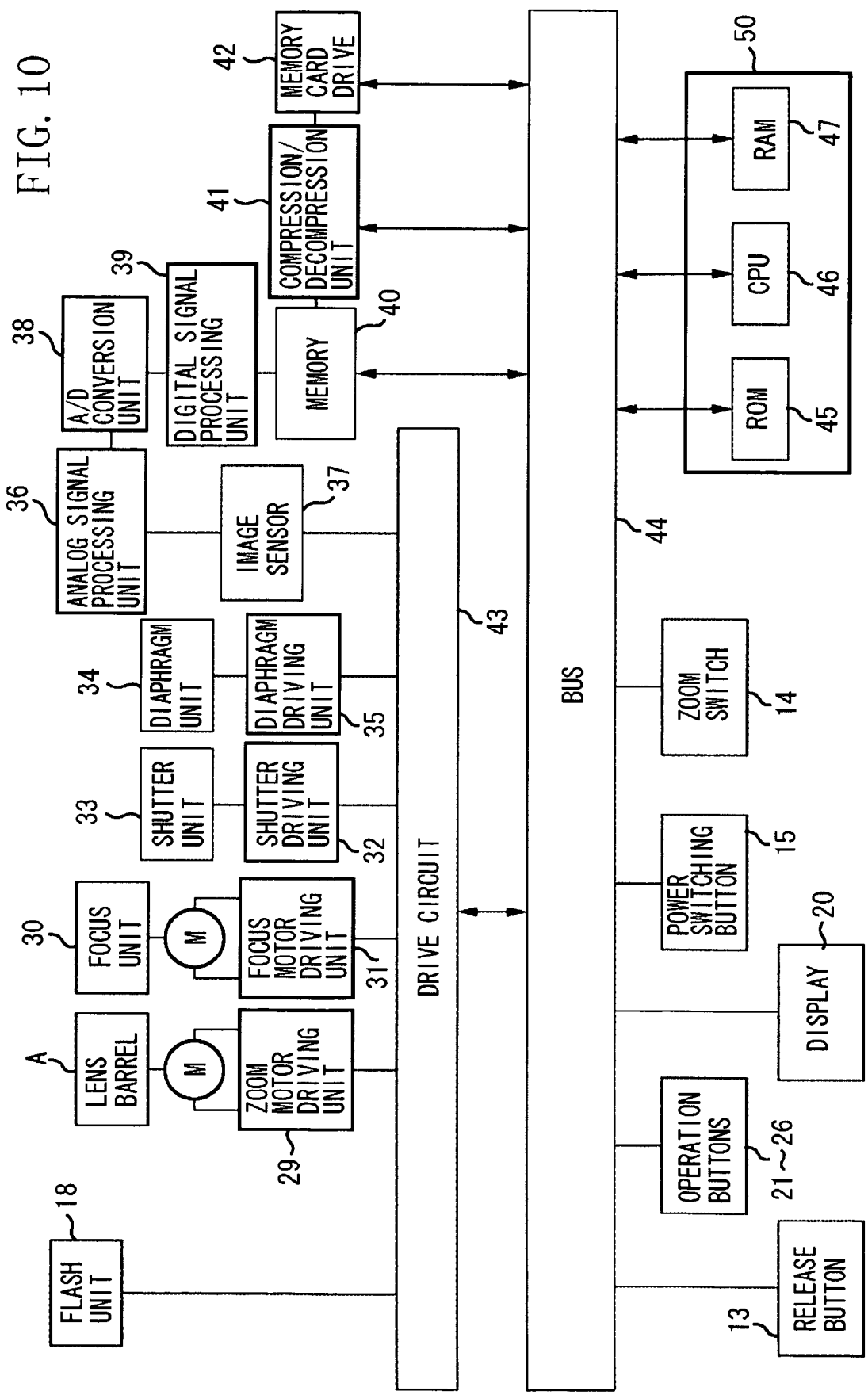
FIG. 10 is a block diagram illustrating main units which configure a digital camera, namely an imaging apparatus having the lens barrel of the exemplary embodiment of the present invention.

FIG. 10 illustrates main units which configure the digital camera 12. On a front face of the digital camera 12, a finder 17 for determining composition of an object, an auxiliary light unit 16 which supplements a light source when light metering and range finding is performed, a flash unit 18, and a lens barrel A are arranged.

On an upper face of the digital camera 12, a release button 13, a power switching button 15, a zoom switch 14, a memory card drive 42, and a card battery cover 28 in which a battery insertion unit (not illustrated) is provided are arranged.

Operation buttons 21, 22, 23, 24, 25, and 26 which allow a user to switch among various functions are arranged on a rear face of the digital camera 12. Further, a display 20 formed from a liquid crystal display (LCD) and a finder eyepiece unit 19 are arranged on the rear face of the digital camera 12.

The user selects an operation mode of the digital camera 12, for example, an image capturing mode, a playback mode, and a moving image capturing mode, by using the operation buttons 21, 22, 23, 24, 25, and 26.

The display 20, namely an image display unit displays on a screen image data which is stored in a memory 40 and image data which is read from the memory card drive 42. Further, if an appropriate mode is selected, a plurality of pieces of captured data can be displayed on the screen with their size reduced.

A control unit 50 includes a central processing unit (CPU) 46, a read only memory (ROM) 45, and a random access memory (RAM) 47. The control unit 50 is connected via a bus 44 to various components, such as the release button 13, the operation buttons 21 to 26, the display 20, the memory 40, and the memory card drive 42.

A zoom motor driving unit 29, a focus motor driving unit 31, a shutter driving unit 32, a diaphragm driving unit 35, an image sensor 37 such as a charge coupled device (CCD) and a complementary metal oxide semiconductor (CMOS), and the flash unit 18 are connected to a drive circuit 43 which is connected to the control unit 50 via the bus 44. The respective driving units are controlled by signals by the control unit 50.

The ROM 45 stores programs for controlling the above various functional components. The RAM 47 stores data necessary for the respective control programs.

When the user switches the power from OFF to ON by operating the power switching button 15, the CPU 46 reads the necessary control program from the ROM 45 to start an initial operation. More specifically, the CPU 46 moves the lens barrel A to a predetermined region where image capturing is possible and starts up an image capturing function, so that the digital camera 12 switches to an image capturing standby state.

When the user presses the release button 13 to capture an image, the CPU 46 causes the image sensor 37 to detect brightness of an object, and determines an aperture value, shutter speed, and whether to set the flash unit 18 to emit light based on the detected light metering value. Further, the user may select whether to set the flash unit 18 to forcibly emit light or not to emit light by operating the operation button 21 beforehand. Next, the CPU 46 performs a range finding operation to measure a distance to the object, and moves a focus unit 30 to a predetermined focus position by driving the focus motor driving unit 31. Then, the CPU 46 opens and closes a shutter unit 33 to capture a desired image on the image sensor A charge corresponding to an amount of incident light based on an exposure control value accumulates on the image sensor 37. The accumulated charge is output to an analog signal processing unit 36 as an image signal.

The captured image data is subjected to analog processing by the analog signal processing unit 36 and then output to an analog-digital (A/D) conversion unit 38. The A/D conversion unit 38 converts the received analog data into digital data. The digital data is output to a digital signal processing unit 39 to be subjected to digital processing. Finally, the digital data is stored in the memory 40.

By operating the operation button 22, the data stored in the memory 40 is compressed or decompressed in a format, such as joint photographic expert group (JPEG), tag image file format (TIFF) and the like, by a compression/decompression unit 41, and is then output to and stored in the memory card drive 42.

If the digital camera 12 does not have the memory 40, the digital data processed by the digital signal processing unit 39 is output to the compression/decompression unit 41, and is stored in the memory card drive 42.

The image data stored in the memory 40 and the image data stored in the memory card drive 42 are decompressed by the compression/decompression unit 41 and can be displayed on the display 20 via the bus 44. If the user views the data on the display 20 and determines that the image corresponding to the data is unnecessary, the user can delete the image by operating the operation button 23.

When the user operates the zoom switch 14, the CPU 46 moves the lens barrel A in an optical axis direction of the lenses by controlling the zoom motor driving unit 29 via the drive circuit 43. Further, a stored image which is displayed on the display 20 can be enlarged/reduced by operation of the zoom switch 14, i.e., "digital zooming" can be performed.

Figure 1:
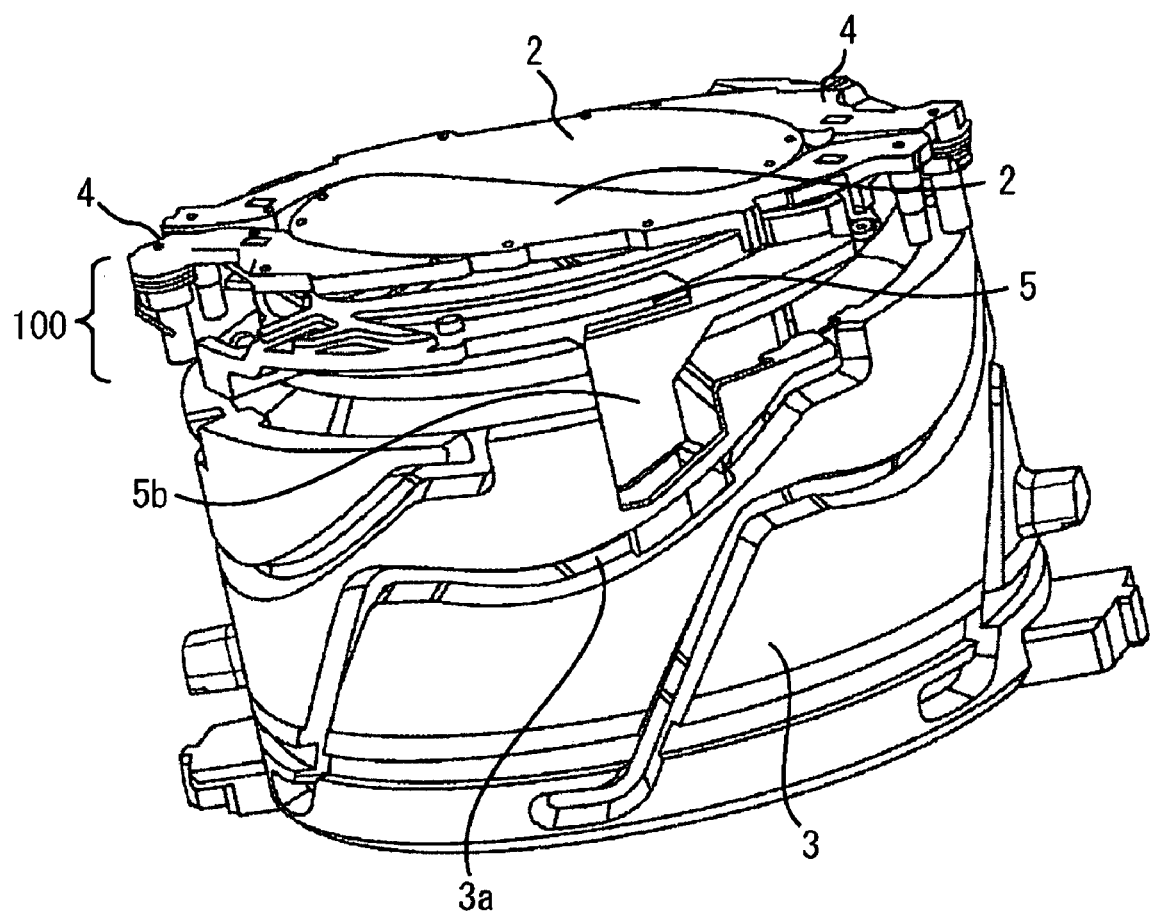
FIG. 1 is a perspective view illustrating a barrier closed state of a lens barrel in an exemplary embodiment of the present invention.
Figure 2:
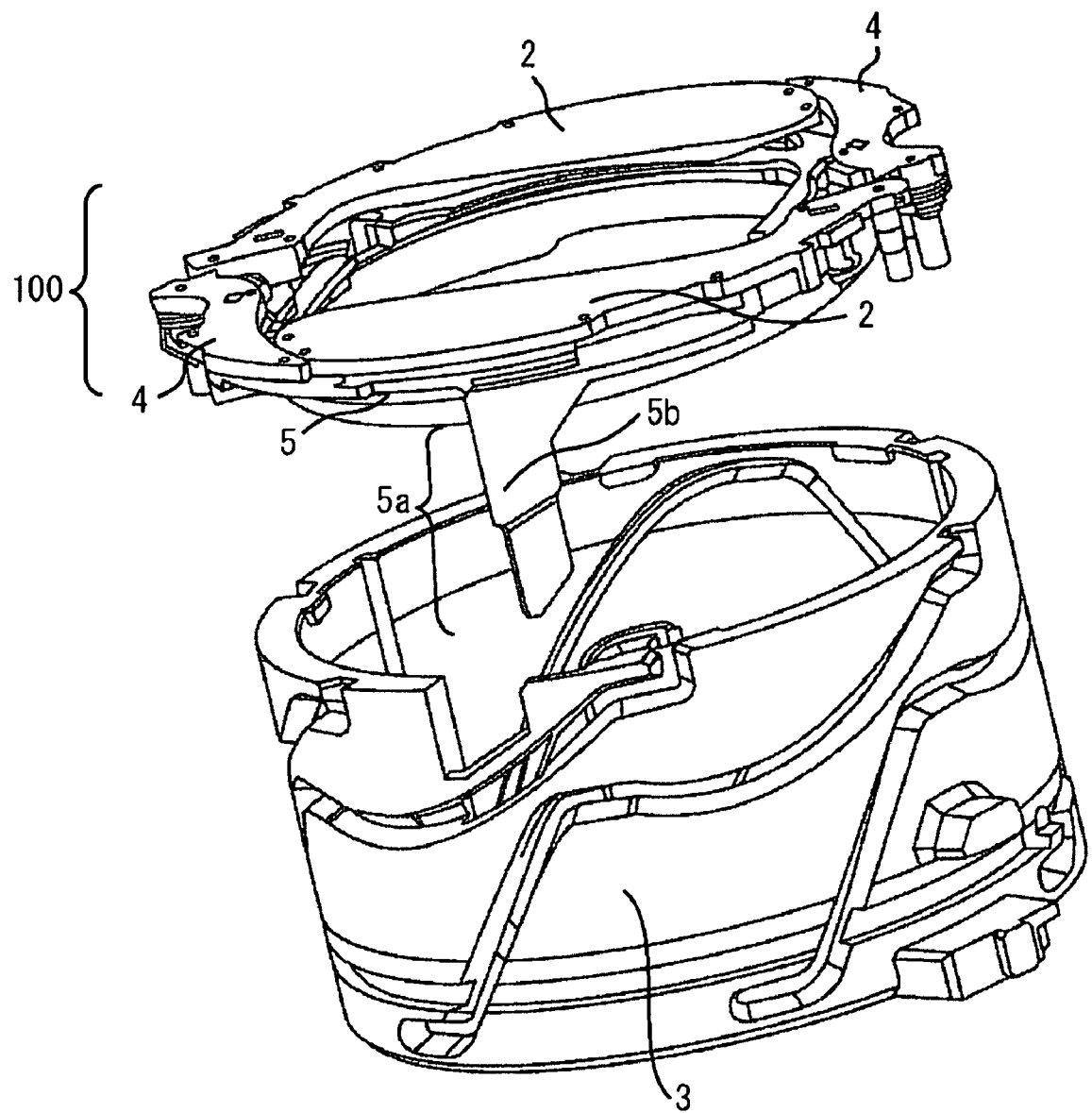
FIG. 2 is a perspective view illustrating a barrier open state of the lens barrel in the exemplary embodiment of the present invention.

The configuration of the lens barrel A provided in the digital camera 12 will be described. FIG. 1 illustrates a perspective view of a second tube 3 serving as a cam ring unit in a state in which the lens barrel A is stored, and a barrier unit 100. FIG. 2 illustrates a perspective view of the second tube 3 in a state in which the lens barrel A can capture an image, and the barrier unit 100. As illustrated in FIG. 2, when the lens barrel A can capture an image, the barrier unit 100 and the second tube 3 are separated from each other.

The barrier unit 100 of the present exemplary embodiment is formed from four blades, and is configured so that a lens aperture of the barrel front face can be opened and closed by opening and closing four barrier blades 2 and 4. The barrier blades 2 and the barrier blades 4 are arranged in a planar state on an upper face of a barrier driving unit 5, and closed as illustrated in FIG. 1. As illustrated in FIG. 2, when the barrier unit 100 and the second tube 3 are separated from each other, the barrier blades 2 and the barrier blades 4 are in an open state.

Figure 3:
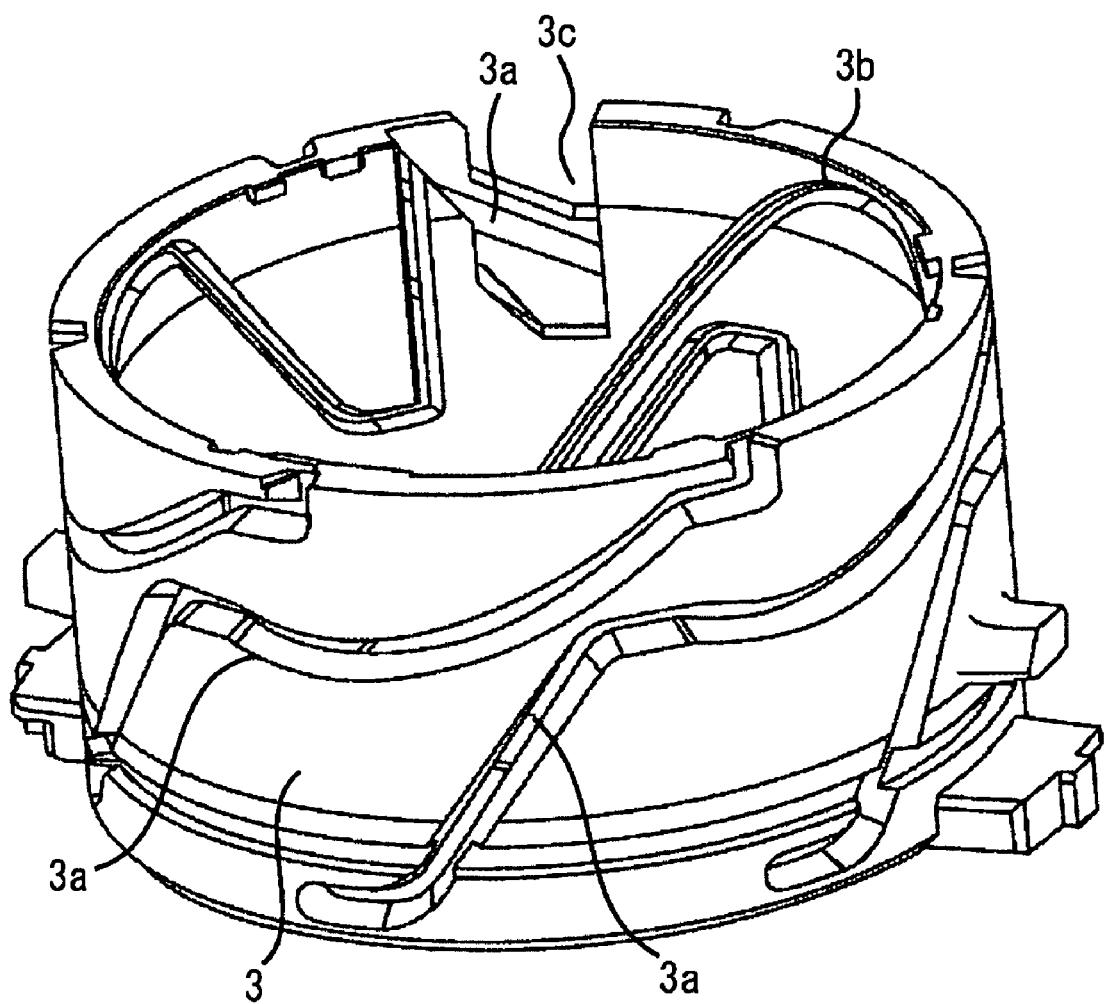
FIG. 3 is a perspective view illustrating a cam ring unit used in the lens barrel in the exemplary embodiment of the present invention.
Figure 4:
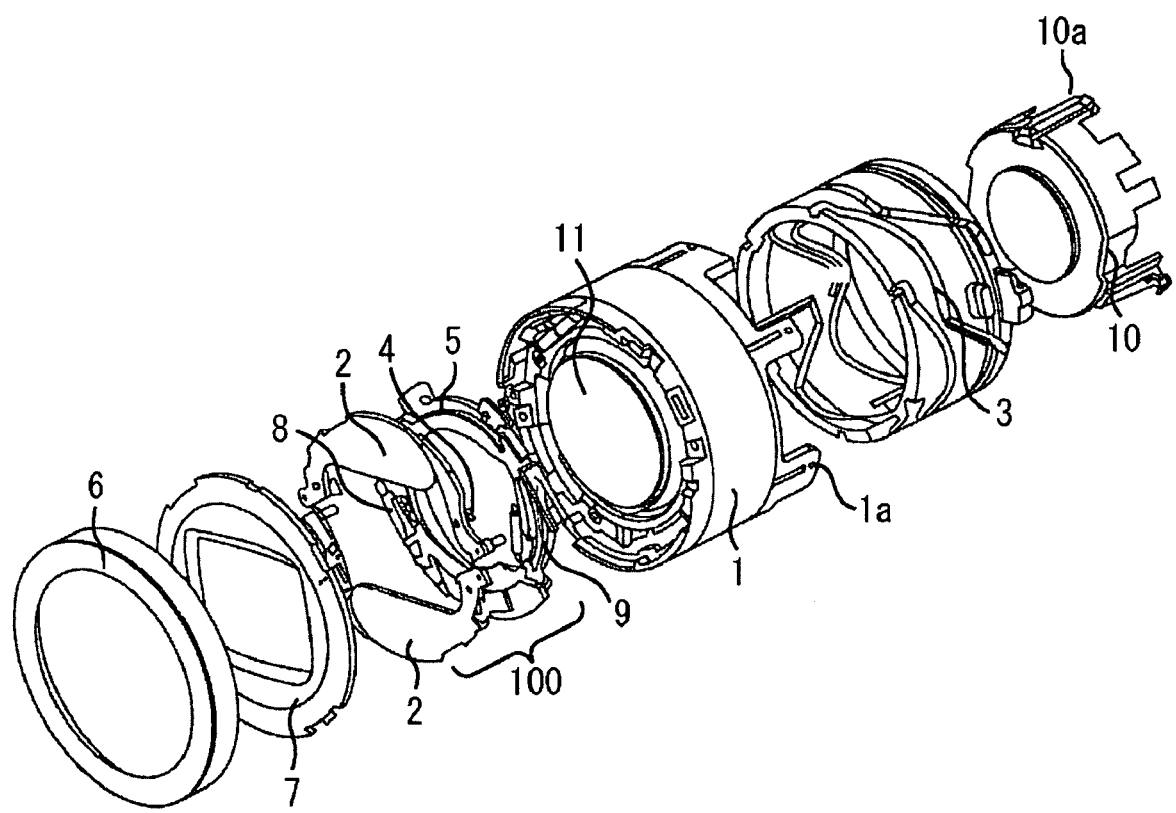
FIG. 4 is an exploded perspective view illustrating the lens barrel in the exemplary embodiment of the present invention.

FIG. 4 illustrates an exploded perspective view of a part of the lens barrel A. A lens 11 is provided in a first tube 1. Further, followers 1a are arranged on the first tube 1. In the present exemplary embodiment, six followers 1a are provided. On a third tube 10, three followers 10a are provided. A cam groove 3a is arranged as an engaging unit on an outer periphery of the second tube 3, and a cam groove 3b is arranged as the engaging unit on an inner periphery of the second tube 3. When the followers 1a of the first tube 1 engage with the cam groove 3a (see FIG. 3) as the engaging unit, a driving force is transmitted to the first tube 1 by rotating the second tube 3, and the first tube 1 can move relative to the second tube 3. Further, when the followers 10a of the third tube 10 engage with the cam groove 3b (see FIG. 3) as the engaging unit, the driving force is transmitted to the third tube 10 by rotating the second tube 3, and the third tube 10 can move relative to the second tube 3. More specifically, the first tube 1 and the third tube 10 move in the optical axis direction along tracks of the cam grooves serving as respective engaging units by rotating the second tube 3. Further, the first tube 1 and the third tube 10 are regulated in their movement in the rotational direction by a regulation unit (not illustrated) which regulates the tubes to move in straight directions only.

The barrier driving unit 5 is arranged on a front end on the object side of the first tube 1. The barrier driving unit 5 can move within a predetermined angle range. The two barrier blades 2 and the two barrier blades 4 are arranged on the upper face of the barrier driving unit 5.

A barrier spring 8 is provided as an elastic member between the barrier blades 2 and the barrier driving unit 5 so that the barrier blades 2 and the barrier driving unit 5 are pulled towards each other. The barrier spring 8 pushes the barrier blades 2 in a direction that the barrier blades 2 open around a rotation center arranged on the first tube 1.

Further, the barrier blades 4 are also pushed by a barrier spring 9 as an elastic member in a direction that the barrier blades 4 close around a separate rotation center provided on the first tube 1. The barrier blades 4 are weighted so as to follow the barrier blades 2. A barrier cover 7 is arranged as a protective member on an upper face of the barrier blades 2 and the barrier blades 4 to prevent the barrier blades 2 and 4 from falling out of the first tube 1. A barrier cap 6 is fixed as a holding member in a vicinity of the barrier cover 7.

As illustrated in FIGS. 1, 2 and 3, a protruding portion 5a is provided as a first interlocking unit on the barrier driving unit 5. The barrier driving unit 5 is rotated when the protruding portion 5a receives a rotational force (driving force) from interlocking with a wall portion 3c as a second interlocking unit provided on the second tube 3. More specifically, when in an image capturing state, since the barrier unit 100 and the second tube 3 are separated from each other, the wall portion 3c and the protruding portion 5a are in a non-interlocking state. On the other hand, as the lens barrel moves closer to a storing state, the barrier unit 100 and the second tube 3 move closer to each other, so that the wall portion 3c and the protruding portion 5a are in the interlocking state.

The cam groove 3b is arranged as an engaging unit on the inner periphery of the second tube 3. Therefore, the protruding portion 5a is arranged so that it does not interfere with the cam groove 3b when the wall portion 3c and the protruding portion 5a move from the non-interlocking state to the interlocking state.

If the second tube 3 is completely cut out in a radial direction in a region where the wall portion 3c and the protruding portion 5a are in the interlocking state, the cam groove 3a arranged as the engaging unit on the outer periphery of the second tube 3 is removed from that region.

Thus, while maintaining the cam groove 3a, a relief portion of the protruding portion 5a is provided at an inner periphery from a cam bottom.

Figure 5:
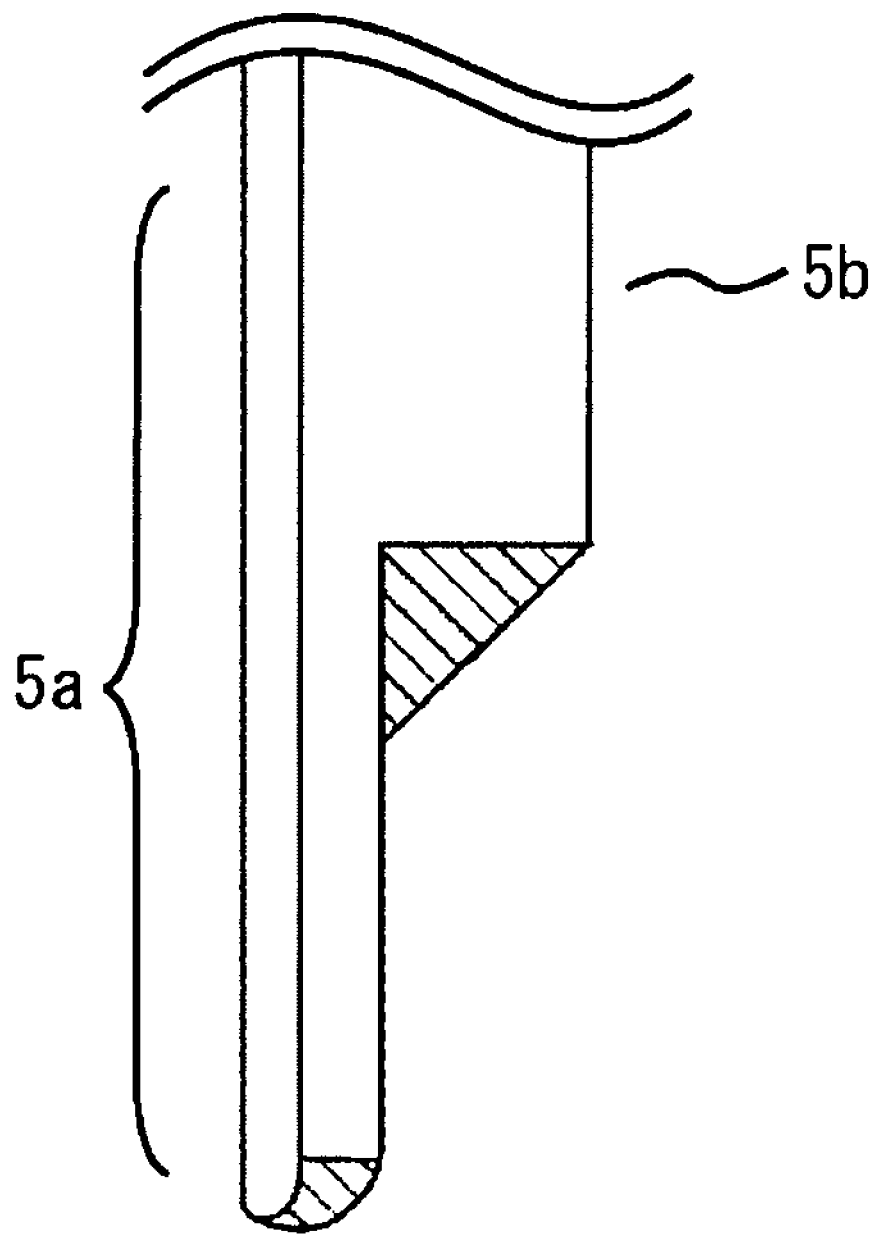
FIG. 5 illustrates a protruding portion in the exemplary embodiment of the present invention.

FIG. 5 illustrates a region of the protruding portion 5a which interlocks with the wall portion 3c. As illustrated in FIG. 5, the protruding portion 5a has a width interlocking with the wall portion 3c which is wider at a rear portion 5b than a front portion.

Therefore, as the lens barrel moves closer to the storing state, the barrier unit 100 and the second tube 3 move closer to each other, so that the wall portion 3c and the protruding portion 5a move from the non-interlocking state to the interlocking state. The interlocking state starts from a narrow width region of the protruding portion 5a by interlocking with the wall portion 3c. Further, as the lens barrel moves closer to the storing state, the rear portion 5b which is the wider region of the protruding portion 5a is also in the interlocking state with the wall portion 3c. When the apparatus shifts from the storing state to the image capturing state, reverse transition occurs.

By configuring in this manner, the rotational force of the barrier driving unit 5 which is necessary to close the barrier blades 2 against the pushing force of the barrier spring 8 as the elastic member can be transmitted over a wide interlocking region.

In other words, as illustrated in FIG. 1, when the barrier unit 100 and the second tube 3 move close to each other, a large load is applied on the protruding portion 5a in order to close the barrier blades 2 and the barrier blades 4. As illustrated in FIG. 2, the protruding portion 5a has the rear portion 5b which is one step thicker than the front portion provided at its base to prevent the protruding portion 5a from breaking. Further, the rear portion 5b is arranged at a position where it does not overlap with either the cam groove 3a or 3b.

Further, when the protruding portion 5a and the wall portion 3c are in the interlocking state, at least a portion of the protruding portion 5a and the cam groove 3a overlap in the radial direction of the second tube 3. On the other hand, the rear portion 5b of the protruding portion 5a, which is wider than the front portion, does not overlap with the cam groove 3a in the radial direction of the second tube 3 since the rear portion 5b is wider than the front portion.

Figure 6:
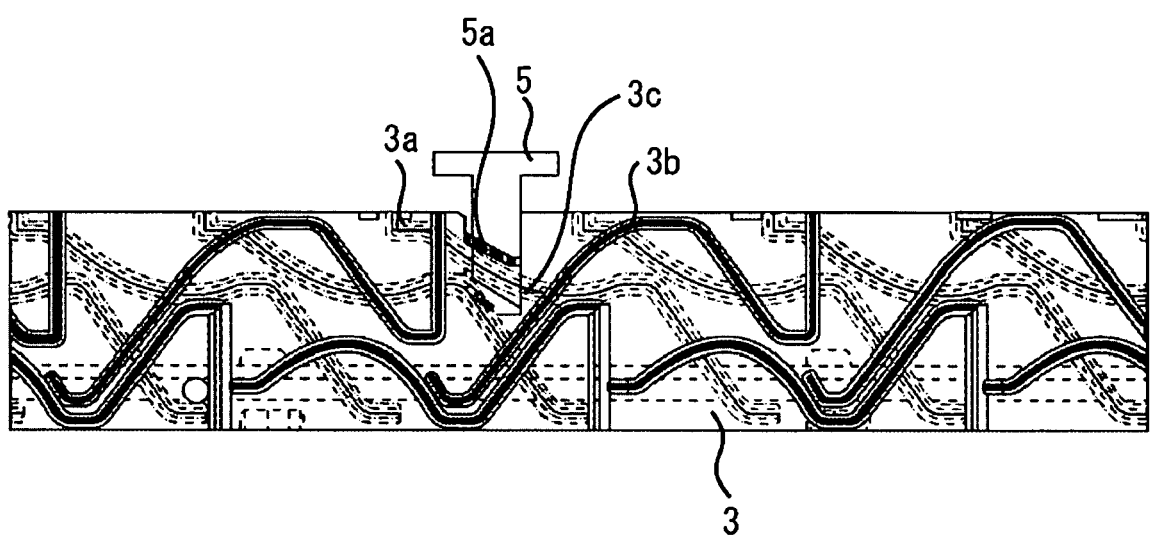
FIG. 6 is an extended elevation of a second tube used in the lens barrel in the exemplary embodiment of the present invention.

FIG. 6 illustrates an extended elevation of the second tube 3. As illustrated in FIG. 6, the wall portion 3c does not overlap in a radial direction or interfere with the cam groove 3b. On the other hand, the wall portion 3c is arranged at a position which overlaps in a radial direction with the cam groove 3a. However, the wall portion 3c does not interfere with the cam groove 3a. This is because, as described above, the cam groove 3a is provided on an outer face and the wall portion 3c is separately provided on an overlapping inner face at a given thickness in the radial direction of the second tube 3. By configuring in this manner, a degree of design freedom of the cam groove 3a can be increased which enables the barrel to be downsized.

Conventionally, the interlocking state is produced in order to transmit the driving force with the barrier driving unit 5 by providing a notch (wall portion) so that the cam grooves 3a and 3b do not interfere with each other. Thus, the tracks of the cams on both the inner and outer sides exert influences. However, the degree of design freedom can be increased by considering only the cam on the inner side according to the present exemplary embodiment.

Further, while the inner side is notched in the above exemplary embodiment, the same effects can be achieved when an inner face cam is maintained and the outer face is notched. More specifically, the cam groove 3a is provided on the inner face and the wall portion 3c is separately provided on an overlapping outer face at the given thickness in the radial direction of the second tube 3.

The present exemplary embodiment is illustrated using a case where the cam grooves 3a and 3b are arranged on the outer face and the inner face. However, even when only the inner face cam or the outer face cam is provided, the same effects can be obtained without being affected by the tracks of the cam. By the wall portion 3c on a side face on which no cam groove is provided, the interlocking state can be realized with the barrier driving unit 5.

Regarding the cam grooves, in addition to a cam which requires movement accuracy, the same effects can be obtained by a shock cam for receiving a shock from drops or the like. More specifically, in the above exemplary embodiment, a cam groove width of the cam groove 3a overlapping the wall portion 3c is increased. As a result, the followers 1a and the cam groove 3a do not normally contact each other, and they contact each other only when an external force is applied. By this configuration, accurate movement can be achieved only with some of the above-described six cam grooves 3a, and the remaining cam grooves 3a fulfill a function for preventing the cam from falling out when a shock is applied. For this purpose, a size of the follower 1a corresponding to the cam groove 3a overlapping the wall portion 3c may also be reduced compared to the other followers 1a, instead of increasing the width of the cam groove 3a.

Figure 11:
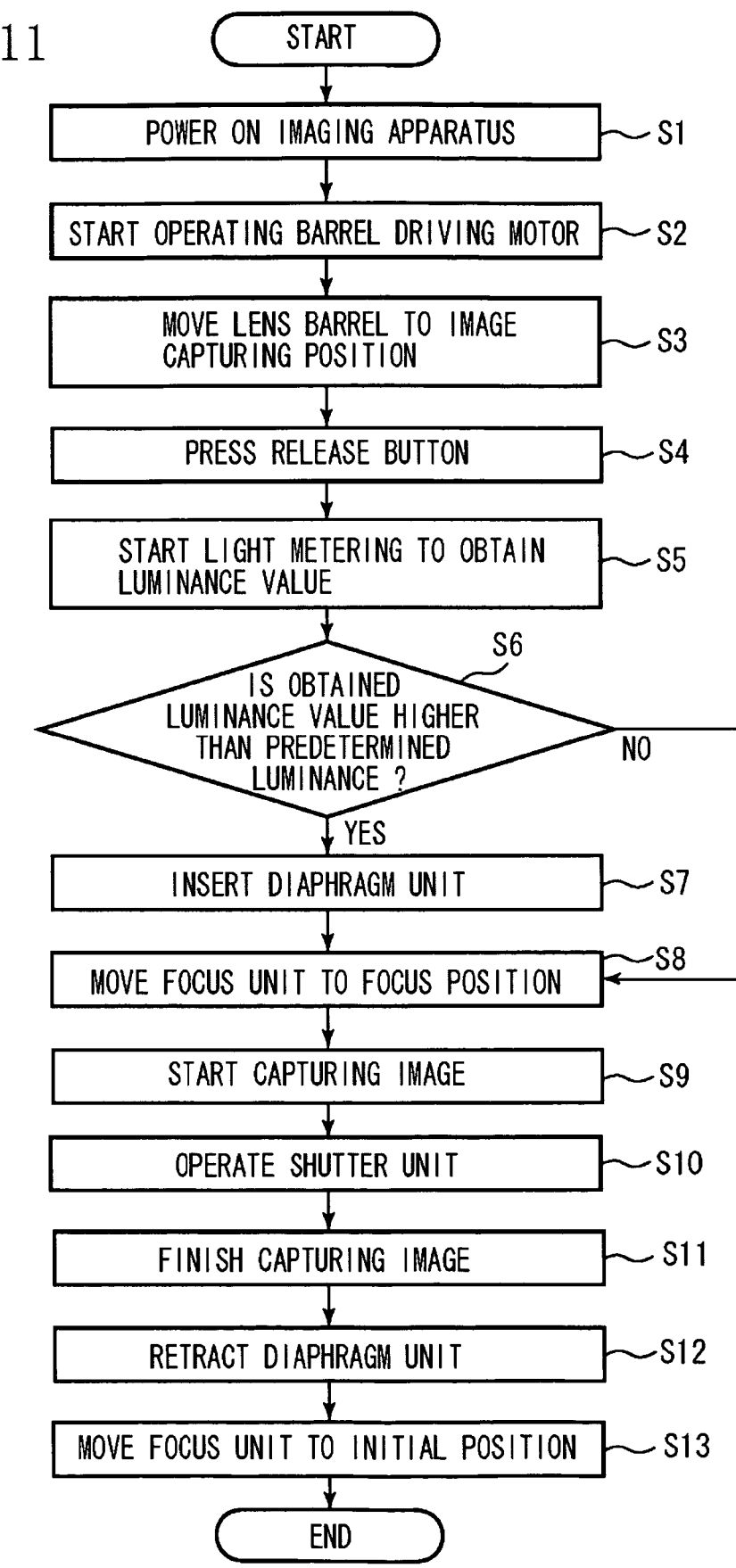
FIG. 11 is a flowchart illustrating an operation sequence of the imaging apparatus having the lens barrel from when the power of a digital camera is ON to when an image is captured according to the exemplary embodiment of the present invention.

FIG. 11 illustrates a flowchart of an operation from the time of switching on the power of the digital camera 12, which is the imaging apparatus according to the exemplary embodiment of the present invention, until image capturing is finished. In step S1, if the user switches on the power of the imaging apparatus, the processing proceeds to step S2. In step S2, the CPU 46 sends an instruction to the zoom motor driving unit 29 to rotate the barrel driving motor in a clockwise direction. Then, the CPU 46 performs a predetermined operation. In step S3, once the CPU 46 confirms that the lens barrel A has moved to an image capturing position, the CPU 46 stops the lens barrel A. At this stage, the state of the lens barrel A changes from the state illustrated in FIG. 7 to the state illustrated in FIG. 8.

Next, in step S4, if the user presses the release button 13, the processing proceeds to step S5. In step S5, the CPU 46 starts light metering to obtain luminance value information about the object. If the obtained luminance value information has a higher luminance than a predetermined luminance (YES in step S6), the processing proceeds to step S7. In step S7, the CPU 46 inserts the diaphragm unit 34 into the optical axis to change the amount of incident light. If the obtained luminance value information has a lower luminance than the predetermined luminance (NO in step S6), the CPU 46 does not operate the diaphragm unit 34, and leaves the diaphragm unit 34 in a state retracted from the optical axis.

Then, in step S8, the CPU 46 moves the focus unit 30 to a position which can focus on the object. In step S9, the CPU 46 starts capturing an image. Next, in step S10, the CPU 46 moves the shutter unit 33 from an open state to a closed state to shield the amount of incident light. In step S11, the CPU 46 finishes capturing the image. Then, in step S12, the CPU 46 retracts the diaphragm unit 34 from the optical axis. In step S13, the CPU 46 moves the focus unit 30 to its initial position to finish the operation.

According to the above configuration, the interlocking of the barrier can be arranged regardless of the cam track of the cam ring, so that design efficiency increases.

Further, a male-female relationship of the engaging unit and the interlocking unit in the above exemplary embodiment may be reversed in design.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-061284 filed Mar. 11, 2008, which is hereby incorporated by reference herein in its entirety.

What is claimed is:

1. A lens barrel comprising:
a first and second tube, the first tube movable relative to the second tube by rotation of the second tube;
an engaging portion disposed on the second tube; and
a barrier driving unit disposed on an object side of the first tube that opens and closes barrier members, the barrier driving unit being forced by a barrier spring,
wherein the first tube is relatively moved in an optical axis direction by engaging with the engaging portion,
wherein the barrier members are closed when a first interlocking portion, which is arranged on the barrier driving unit, and a second interlocking portion, which is arranged on the second tube, are shifted from a non-interlocking state to an interlocking state, and the barrier members are opened when the first interlocking portion and the second interlocking portion are shifted from the interlocking state to the non-interlocking state, and
wherein when the first interlocking portion and the second interlocking portion are in the interlocking state, at least a portion of the first interlocking portion and the engaging portion overlap with each other in the optical axis direction and does not interfere with each other in a radial direction of the second tube.

2. The lens barrel according to claim 1, wherein the engaging portion is arranged on an outer face of the second tube.

3. The lens barrel according to claim 1, further comprising a third tube which moves relative to the second tube by rotation of the second tube,
wherein the third tube can move relative to the second tube by a cam unit which is arranged on an inner face of the second tube.

4. The lens barrel according to claim 1, wherein the engaging portion is arranged on an inner face of the second tube.

5. The lens barrel according to claim 1, wherein the first interlocking portion has a width interlocking with the second interlocking portion which is wider at a tailing edge than at a leading edge.

6. The lens barrel according to claim 1, wherein at least a part of a portion of the first interlocking portion which is wider than a leading edge thereof does not overlap with the engaging portion in the radial direction of the second tube.

* * * * *